US012381696B2

(12) United States Patent
Kumar et al.

(10) Patent No.: US 12,381,696 B2
(45) Date of Patent: Aug. 5, 2025

(54) TECHNIQUES FOR PERFORMING PHASE TRACKING FOR MULTIPLE COMPONENT CARRIERS

(71) Applicant: QUALCOMM Incorporated, San Diego, CA (US)

(72) Inventors: Satish Kumar, Hyderabad (IN); Sarath Pinayour Chandrasekaran, Hyderabad (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 596 days.

(21) Appl. No.: 17/745,446

(22) Filed: May 16, 2022

(65) Prior Publication Data

US 2023/0370236 A1  Nov. 16, 2023

(51) Int. Cl.
*H04L 5/00* (2006.01)
*H04L 1/00* (2006.01)

(52) U.S. Cl.
CPC .......... *H04L 5/0092* (2013.01); *H04L 1/0003* (2013.01); *H04L 5/001* (2013.01); *H04L 5/0051* (2013.01)

(58) Field of Classification Search
CPC ..... H04L 5/0092; H04L 1/0003; H04L 5/001; H04L 5/0051; H04L 5/0048; H04L 5/0094
See application file for complete search history.

(56) References Cited

U.S. PATENT DOCUMENTS

| | | | | |
|---|---|---|---|---|
| 2022/0060361 | A1* | 2/2022 | Zhang | H04J 13/0062 |
| 2022/0116859 | A1* | 4/2022 | Park | H04L 5/0023 |
| 2022/0337459 | A1* | 10/2022 | Taherzadeh Boroujeni | H04W 72/21 |
| 2022/0345345 | A1* | 10/2022 | Kim | H04L 5/0096 |
| 2022/0385418 | A1* | 12/2022 | Paz | H04W 72/51 |
| 2023/0053678 | A1* | 2/2023 | Paz | H04L 5/0048 |

FOREIGN PATENT DOCUMENTS

| | | | | |
|---|---|---|---|---|
| WO | WO-2022031919 A1 * | 2/2022 | | H04L 5/0044 |
| WO | WO-2022080613 A1 * | 4/2022 | | H04L 1/0025 |
| WO | WO-2024170060 A1 * | 8/2024 | | |

* cited by examiner

*Primary Examiner* — Rina C Pancholi
(74) *Attorney, Agent, or Firm* — Arent Fox, LLP

(57) ABSTRACT

This disclosure provides systems, methods and apparatus, including computer programs encoded on computer storage media, for performing phase compensation. In some aspects, a user equipment (UE) can receive, from a network node, a configuration indicating a reduced number of multiple configured component carrier (CCs) over which to process one or more phase tracking reference signals (PTRSs) for performing phase compensation for the multiple configured CCs, receiving, over the reduced number of multiple configured CCs, the one or more PTRSs, and performing, based on the one or more PTRSs, phase compensation for the multiple configured CCs. In other aspects, the network node can transmit the configuration and/or the one or more PTRSs.

20 Claims, 7 Drawing Sheets

TECHNIQUES FOR PERFORMING PHASE TRACKING FOR MULTIPLE COMPONENT CARRIERS

TECHNICAL FIELD

This disclosure relates to wireless communication systems, and to performing phase tracking using phase tracking reference signals.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In some aspects, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G NR, user equipment (UEs) can receive, from network nodes, phase tracking reference signals (PTRSs) for performing phase compensation for a corresponding component carrier (CC) and/or communications received over the CC.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication, the method including receiving, from a network node, a configuration indicating a reduced number of multiple configured component carrier (CCs) over which to process one or more phase tracking reference signals (PTRSs) for performing phase compensation for the multiple configured CCs, receiving, over the reduced number of multiple configured CCs, the one or more PTRSs, and performing, based on the one or more PTRSs, phase compensation for the multiple configured CCs.

Another innovative aspect of the subject matter described in this disclosure can be implemented in a method for wireless communication, the method including transmitting a configuration indicating a reduced number of multiple configured CCs over which to process one or more PTRSs for performing phase compensation for the multiple configured CCs; and transmitting, over the reduced number of multiple configured CCs, the one or more PTRSs.

Another innovative aspect of the subject matter described in this disclosure can be implemented in an apparatus that can include a transceiver, a memory configured to store instructions, and one or more processors communicatively coupled with the transceiver and the memory. The one or more processors may be configured to perform one or more of the methods described above and further herein.

Another innovative aspect of the subject matter described in this disclosure can be implemented in an apparatus that can include means for performing one or more of the methods described above and further herein.

Another innovative aspect of the subject matter described in this disclosure can be implemented in a computer-readable medium that can include code executable by one or more processors to perform one or more of the methods described above and further herein.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
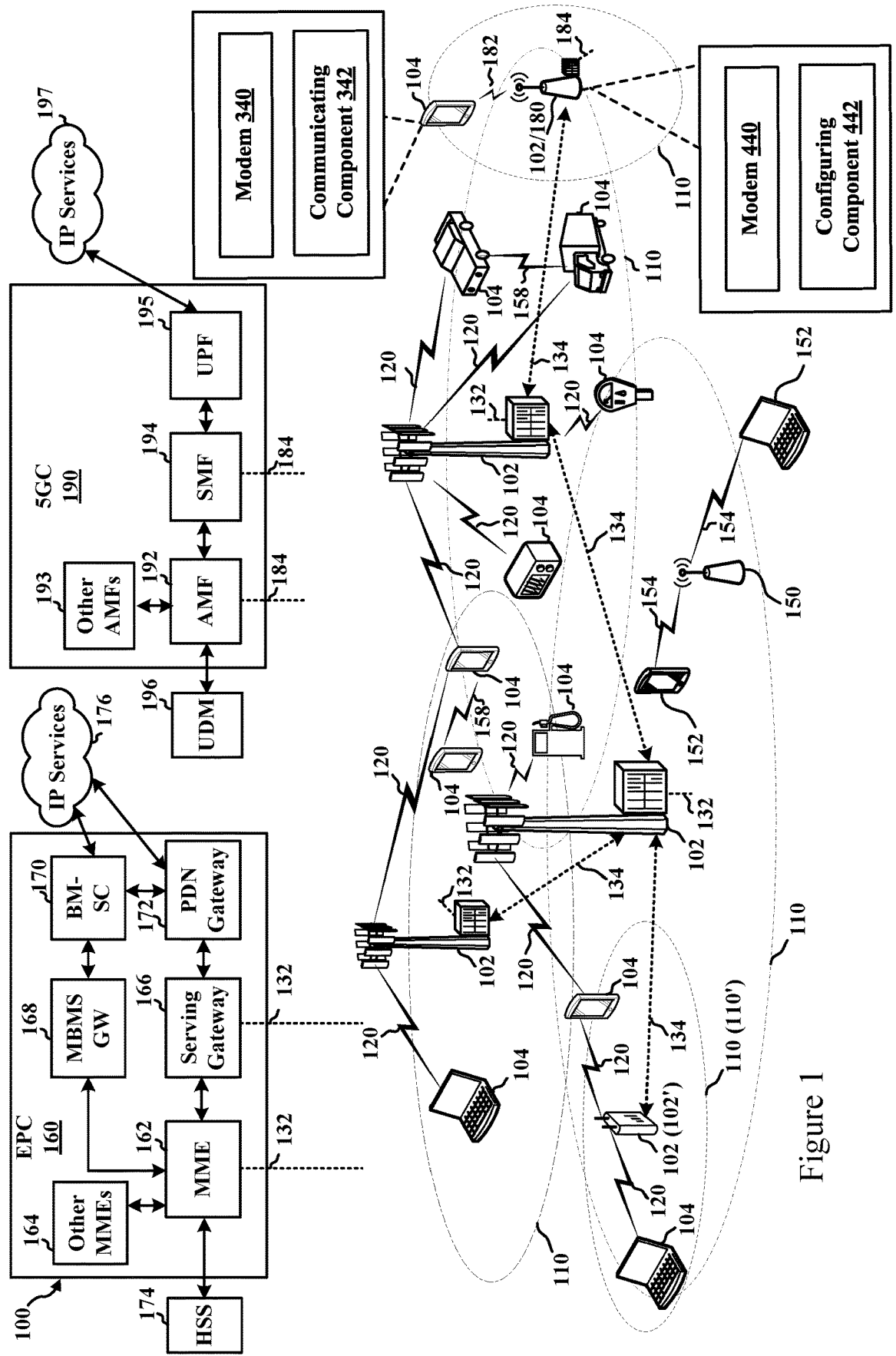
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or interne of things (IOT) network, such as a system utilizing 3G, 4G or 5G, or further implementations thereof, technology.

In some wireless communication technologies, such as 5G, user equipment (UEs) can receive, from a network node, a phase tracking reference signal (PTRS) over a component carrier (CC) for performing phase compensation for that CC. For example, the PTRS can be useful in estimating and correcting phase for signals that are modulated using quadrature amplitude modulation (QAM). The impact of phase noise can be increased for UEs allocated with higher modulation and coding schemes (MCSs) as the modulation order increases. Similarly, phase estimation can become important in higher frequency ranges. In multi-CC configurations, where the UE can be configured (e.g., by the network node) for communications over multiple CCs (e.g., concurrently), for example, PTRS configuration can be enabled or disabled per carrier through radio resource control (RRC) signaling for the CC. For example, where the UE is configured to communicate over two CCs, currently in 5G NR, PTRS can be enabled/disabled on both carriers, or enabled on one of the carriers only. In some multi-CC configurations, such as intra-band carrier aggregation (CA), the CCs can be in contiguous frequency allocations, which may have lower variation in phase across CCs than in multi-CC configurations that are not contiguous (or are otherwise spread apart) in frequency. The variation in phase can even be negligible for cases where the CCs or related communications are produced by same physical radio frequency (RF) resources (e.g., the same transmit (Tx) chain, for example using same fast Fourier transform (FFT), up conversion, power amplifier (PA), and/or the like).

In such examples where the variation in phase is small or negligible, allocating PTRS on both CCs may not be needed and may be inefficient, as it may bring little to no performance gain, while reducing throughput due to the additional PTRS signaling. In an example, PTRS estimation can be performed on one CC and can be leveraged and used for another CC, or a certain low-density combination can be used from both CCs instead of high density PTRS. There can be various mechanisms for arranging PTRS configuration in multi-CC configurations for improved or optimum throughput and phase estimation performance. In an example, the UE and network node may exchange capability information based on which PTRS configuration for multi-CC configuration can be enabled.

In accordance with aspects described herein, a UE can receive, and/or a network node can transmit, a configuration indicating a reduced number of multiple CCs over which to process one or more PTRSs for performing phase compensation for the multiple CCs. The UE can receive the one or more PTRSs and accordingly perform phase compensation for the multiple CCs based on the one or more PTRSs. In one specific example, for two CCs, the configuration can indicate to receive a PTRS over one of the two CCs and use that one PTRS to perform phase compensation for both CCs.

Particular implementations of the subject matter described in this disclosure can be implemented to realize one or more of the following potential advantages. Using the lower number of PTRSs may conserve signaling overhead associated with otherwise transmitting PTRS on each of the multiple CCs, and the PTRS may be sufficient for phase compensation on CCs that are adjacent (or nearby one another) in frequency. Conserving signaling overhead, in this regard, may allow for more efficient or optimal utilization of frequency resources for wireless communications, which can improve throughput and/or speed of UEs, which can improve user experience.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, or a 5G Core (5GC) 190. The base stations 102 may include macro cells (high power cellular base station) or small cells (low power cellular base station). The macro cells can include base stations. The small cells can include femtocells, picocells, and microcells. In an example, the base stations 102 also may include gNBs 180, as described further herein. In one example, some nodes of the wireless communication system may have a modem 340 and communicating component 342 for performing phase compensation for multiple CCs based on a reduced number of PTRSs, in accordance with aspects described herein. In addition, some nodes may have a modem 440 and configuring component 442 for configuring a device for performing phase compensation for multiple CCs based on a reduced number of PTRSs, in accordance with aspects described herein. Though a UE 104 is shown as having the modem 340 and communicating component 342 and a base station 102/gNB 180 is shown as having the modem 440 and configuring component 442, this is one illustrative example, and substantially any node or type of node may include a modem 340 and communicating component 342 or a modem 440 and configuring component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The gNB 180 (such as a mmW base station) may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 or gNB 180 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, communicating component 342 can receive a configuration for performing phase compensation for multiple CCs based on a reduced number of PTRSs. In one example, configuring component 442 can transmit the configuration to the UE 104. The configuration may include one or more parameters for performing the phase compensation, such as an indication to use a reduced number of PTRSs, an indication of which PTRS(s) to use (or how to determine which PTRS(s) to use), a PTRS to use in given time divisions or for given codewords, etc. Using a reduced number of PTRSs, in this regard, can reduce signaling and signal processing overhead where variation in phase across the multiple CCs may be small or negligible (e.g., where the multiple CCs are adjacent or within a threshold span of one another in frequency).

Figure 2:
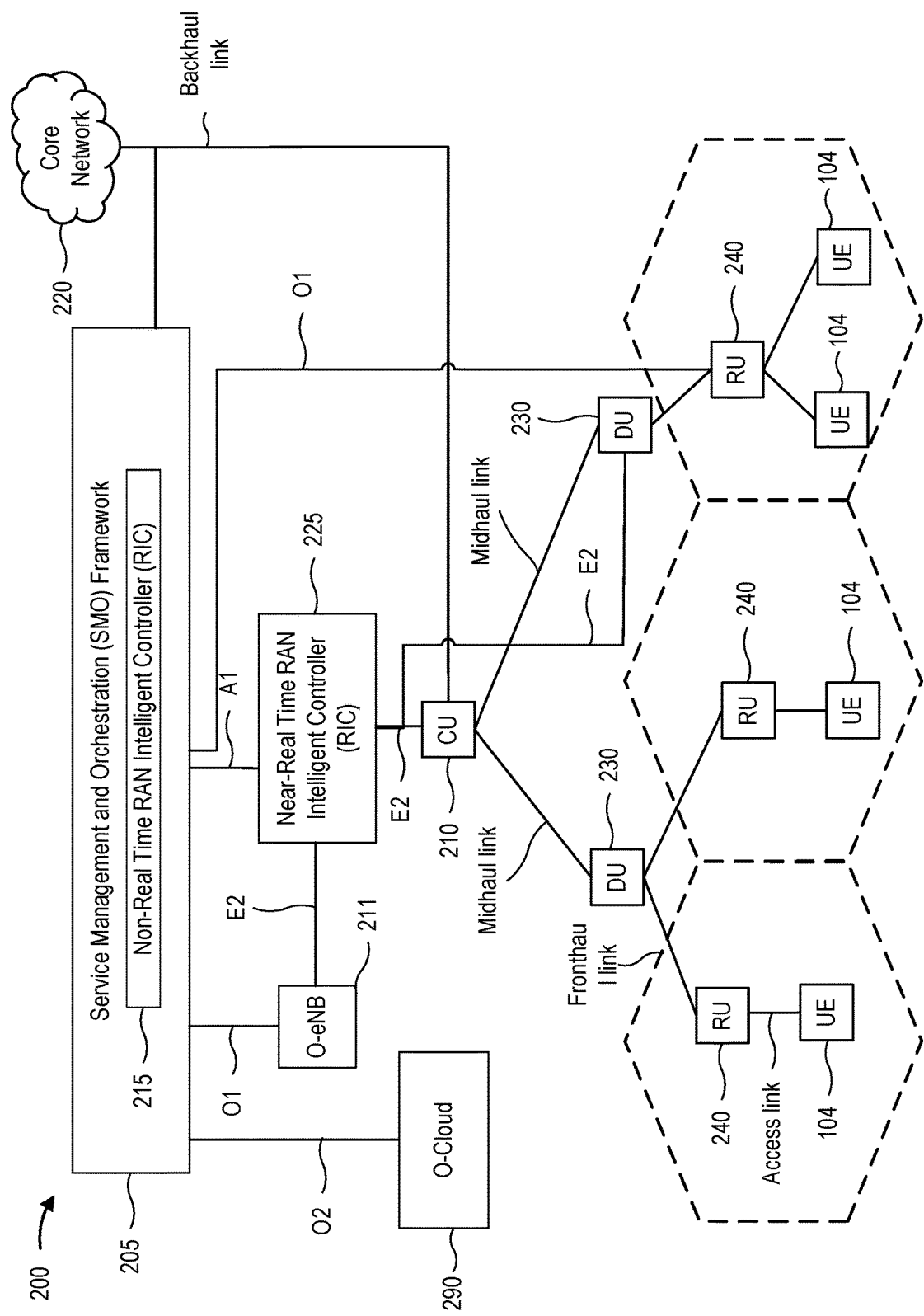
FIG. 2 is a diagram illustrating an example of disaggregated base station architecture.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT MC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
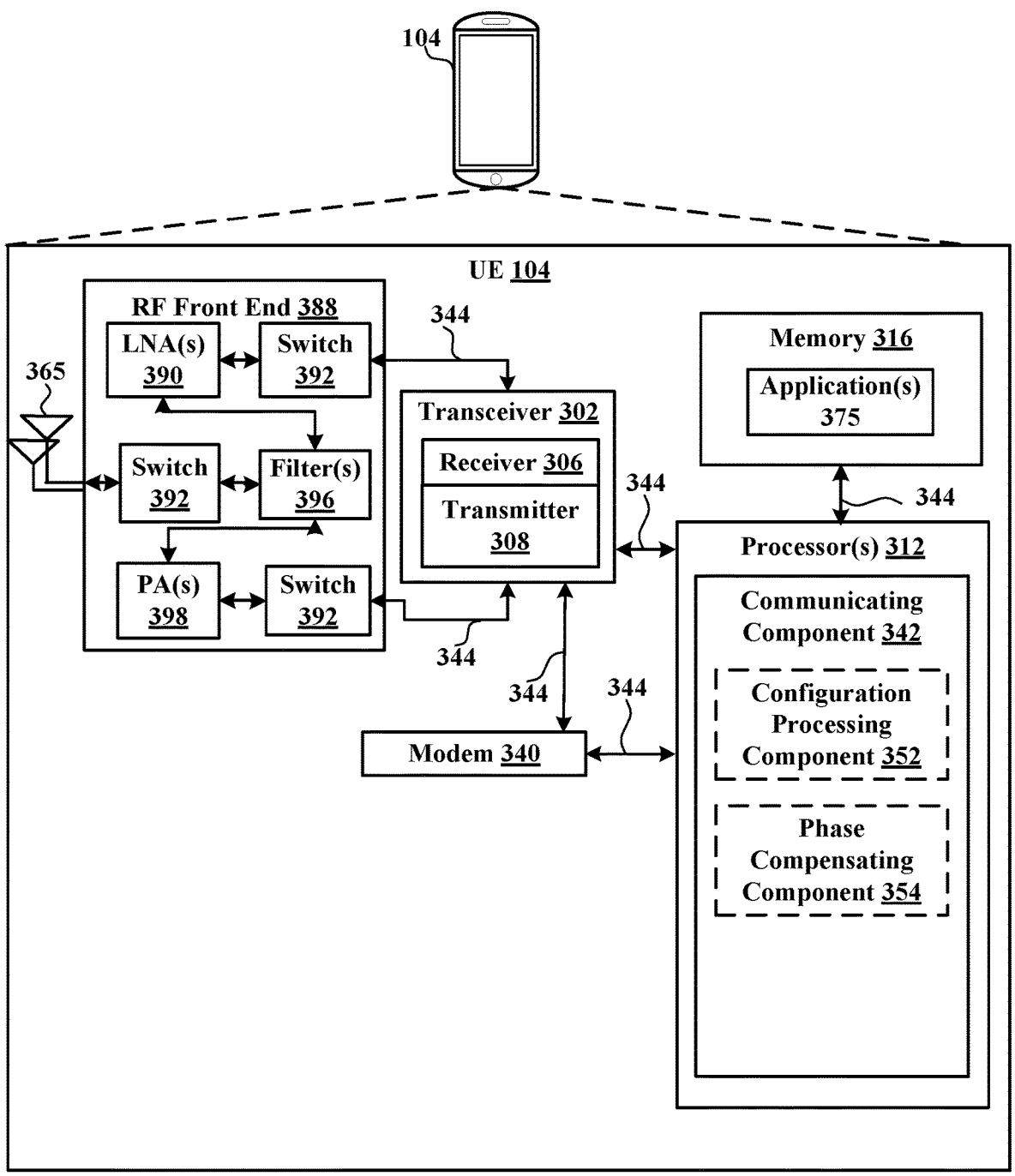
FIG. 3 illustrates an example of a user equipment (UE).
Figure 4:
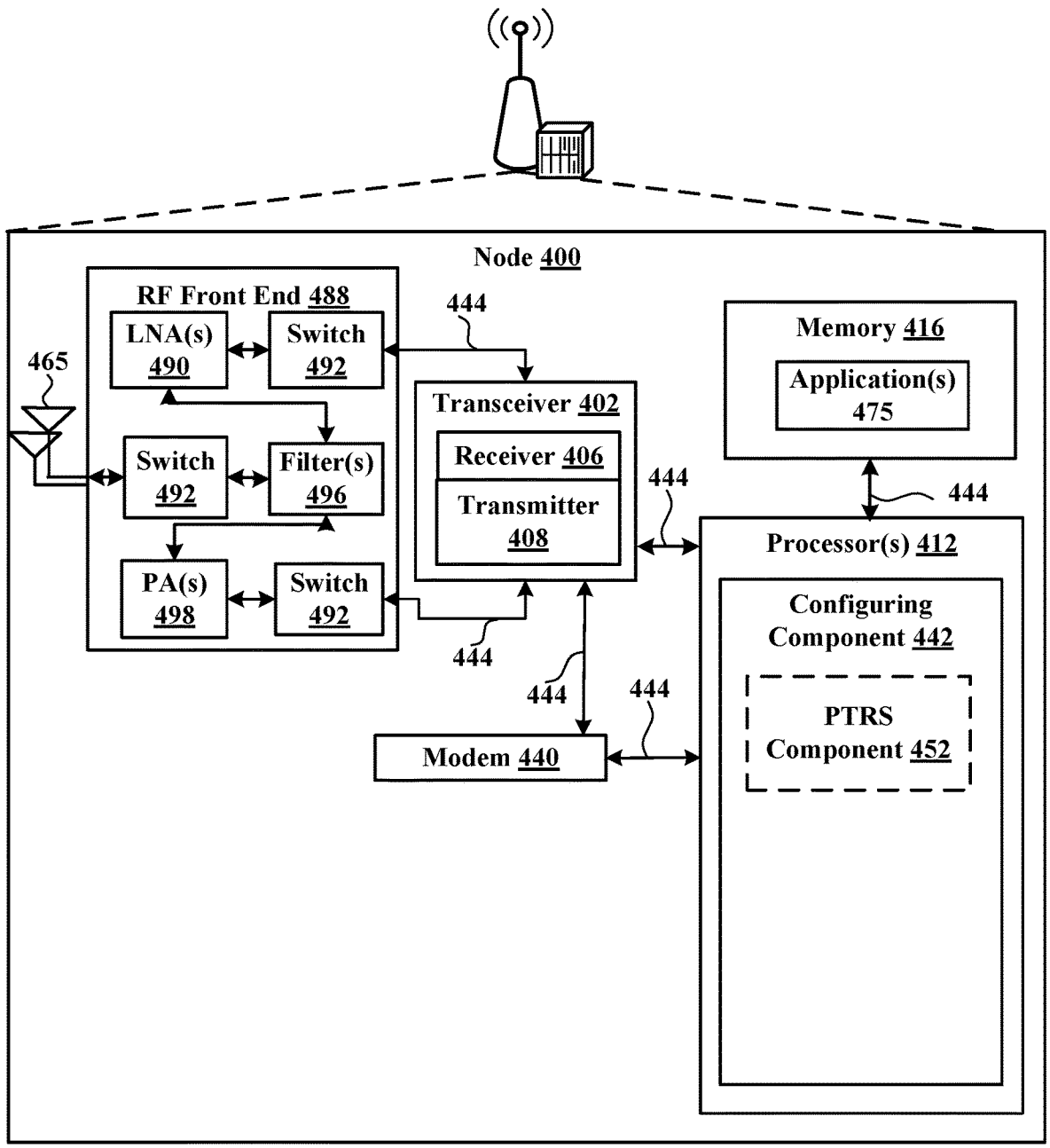
FIG. 4 illustrates an example of a base station.
Figure 5:
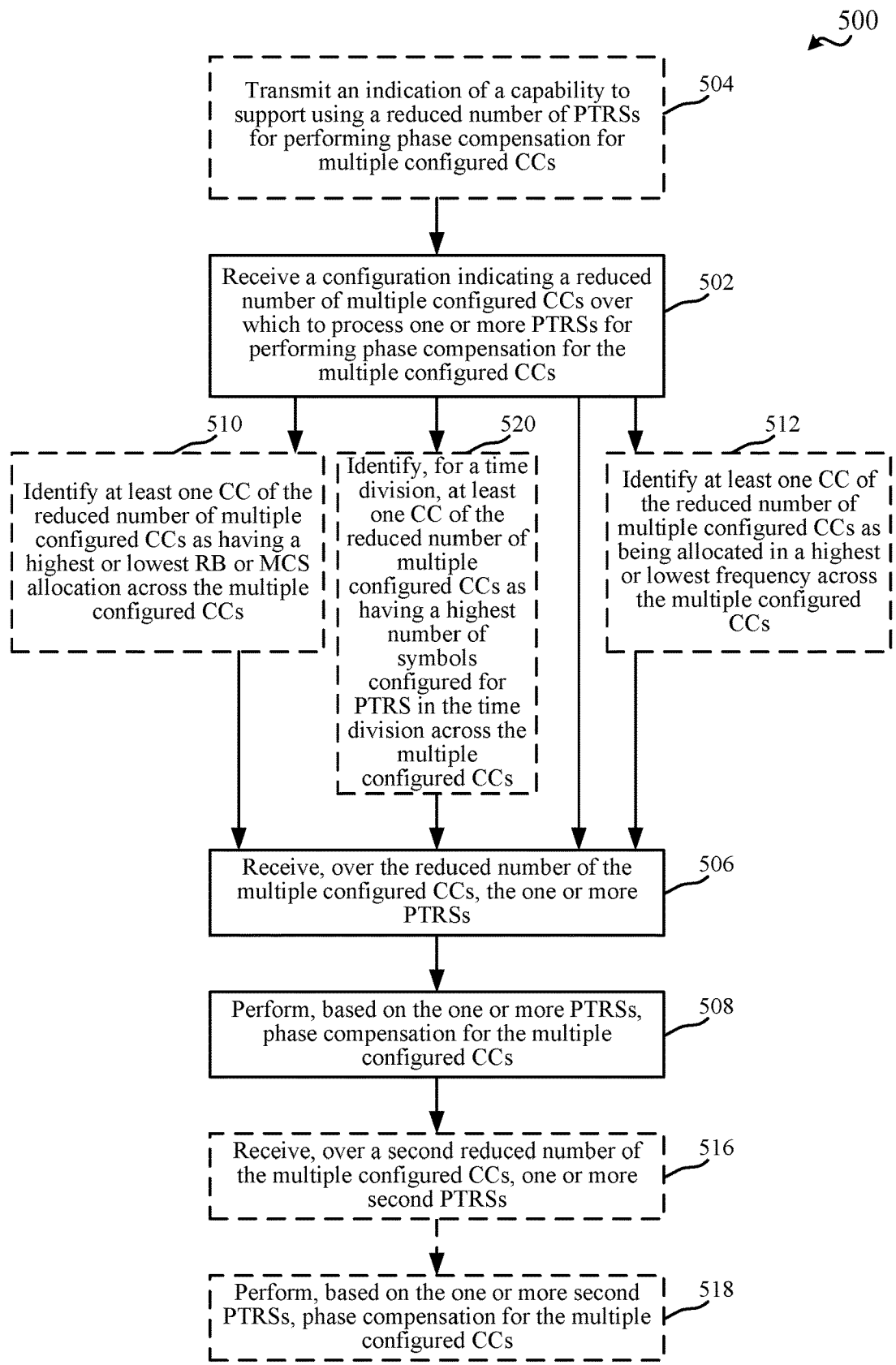
FIG. 5 illustrates an example of a flow chart of a method for performing phase compensation for multiple component carriers (CCs) using a reduced number of phase tracking reference signals (PTRSs).
Figure 6:
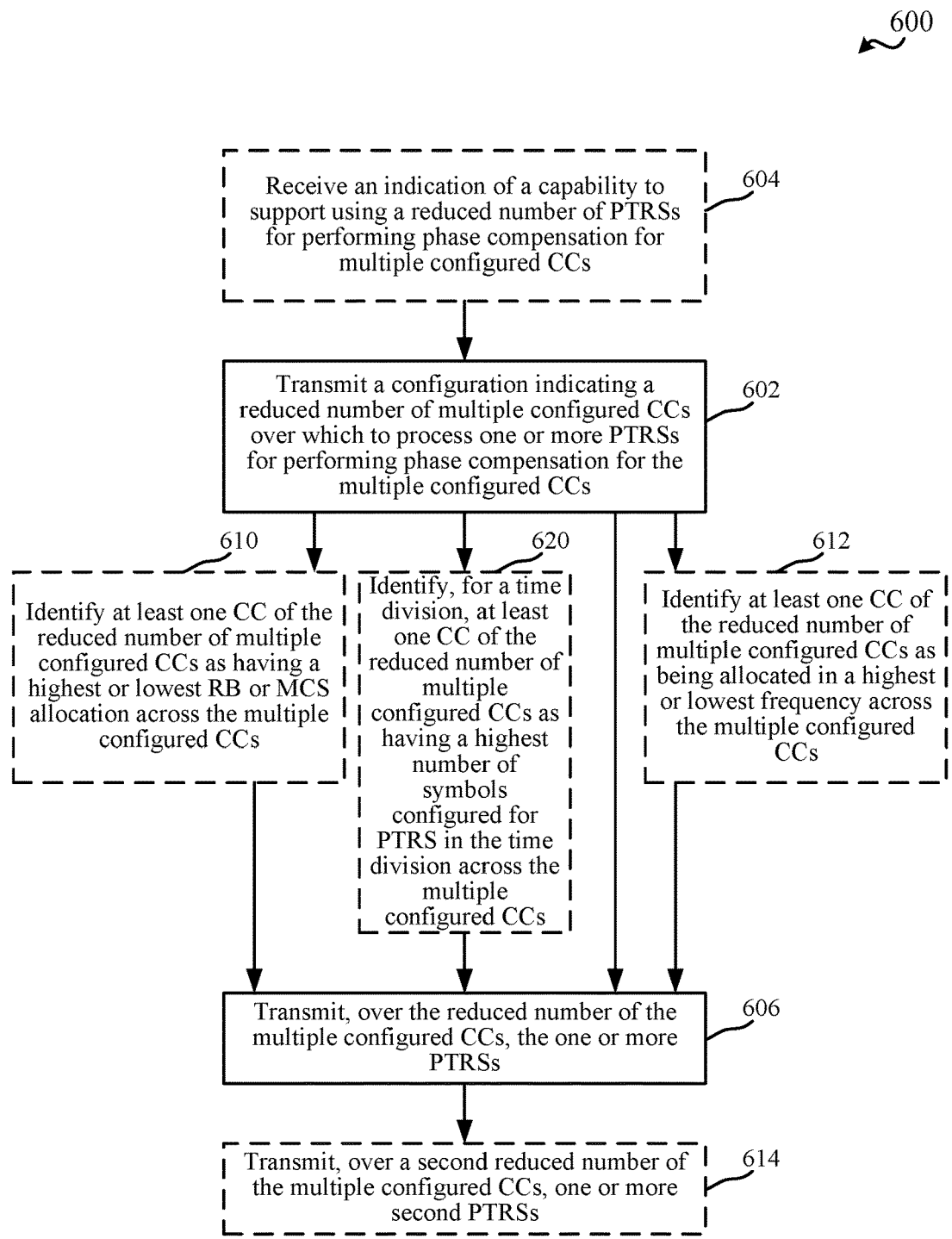
FIG. 6 illustrates an example of a flow chart of a method for configuring a device for performing phase compensation for multiple CCs using a reduced number of PTRSs.

Turning now to FIGS. 3-7, aspects are depicted with reference to one or more components and one or more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the implementation. Moreover, it should be understood that the following actions, functions, or described components may be performed by a specially programmed processor, a processor executing specially programmed software or computer-readable media, or by any other combination of a hardware component or a software component capable of performing the described actions or functions.

FIG. 3 illustrates an example of a user equipment (UE) 104. The UE 104 may include a variety of components, some of which have already been described above and are described further herein, including components such as one or more processors 312 and memory 316 and transceiver 302 in communication via one or more buses 344, which may operate in conjunction with modem 340 or communicating component 342 for performing phase compensation for multiple CCs based on a reduced number of PTRSs, as described herein.

In some aspects, the one or more processors 312 can include a modem 340 or can be part of the modem 340 that uses one or more modem processors. Thus, the various functions related to communicating component 342 may be included in modem 340 or processors 312 and, in some aspects, can be executed by a single processor, while in other aspects, different ones of the functions may be executed by a combination of two or more different processors. For example, in some aspects, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 or modem 340 associated with communicating component 342 may be performed by transceiver 302.

Also, memory 316 may be configured to store data used herein or local versions of applications 375 or communicating component 342 or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In some aspects, for example, memory 316 may be a non-transitory computer-readable storage medium that stores one or more computer-executable codes defining communicating component 342 or one or more of its subcomponents, or data associated therewith, when UE 104 is operating at least one processor 312 to execute communicating component 342 or one or more of its subcomponents.

Transceiver 302 may include at least one receiver 306 and at least one transmitter 308. Receiver 306 may include hardware or software executable by a processor for receiving data, the code including instructions and being stored in a memory (such as computer-readable medium). Receiver 306 may be, for example, a radio frequency (RF) receiver. In some aspects, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware or software executable by a processor for transmitting data, the code including instructions and being stored in a memory (such as computer-readable medium). A suitable example of transmitter 308 may including, but is not limited to, an RF transmitter.

Moreover, in some aspects, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In some aspects, LNA 390 can amplify a received signal at a desired output level. In some aspects, each LNA 390 may have a specified minimum and maximum gain values. In some aspects, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In some aspects, each PA 398 may have specified minimum and maximum gain values. In some aspects, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in some aspects, for example, a respective filter 396 can be used to filter an output from a respective PA 398 to produce an output signal for transmission. In some aspects, each filter 396 can be connected to a specific LNA 390 or PA 398. In some aspects, RF front end 388 can use one or more switches 392 to select a transmit or receive path using a specified filter 396, LNA 390, or PA 398, based on a configuration as specified by transceiver 302 or processor 312.

As such, transceiver 302 may be configured to transmit and receive wireless signals through one or more antennas 365 via RF front end 388. In some aspects, transceiver may be tuned to operate at specified frequencies such that UE 104 can communicate with, for example, one or more base stations 102 or one or more cells associated with one or more base stations 102. In some aspects, for example, modem 340 can configure transceiver 302 to operate at a specified frequency and power level based on the UE configuration of the UE 104 and the communication protocol used by modem 340.

In some aspects, modem 340 can be a multiband-multimode modem, which can process digital data and communicate with transceiver 302 such that the digital data is sent and received using transceiver 302. In some aspects, modem 340 can be multiband and be configured to support multiple frequency bands for a specific communications protocol. In some aspects, modem 340 can be multimode and be configured to support multiple operating networks and communications protocols. In some aspects, modem 340 can control one or more components of UE 104 (such as RF front end 388, transceiver 302) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, communicating component 342 can optionally include a configuration processing component 352 for receiving and processing or otherwise utilizing a configuration indicating parameters for performing phase compensation for multiple CCs using a reduced number of PTRSs, and/or a phase compensating component 354 for performing the phase compensation for multiple CCs using a reduced number of PTRSs, as described herein.

In some aspects, the processor(s) 312 may correspond to one or more of the processors described in connection with the UE in FIG. 7. Similarly, the memory 316 may correspond to the memory described in connection with the UE in FIG. 7.

Referring to FIG. 4, one example of an implementation of a node 400, such as a base station 102 (such as a base station 102 or gNB 180, as described above), which may be a monolithic base station, one or more components of a disaggregated base station, etc., as described above. The node 400 may include a variety of components, some of which have already been described above, but including components such as one or more processors 412 and memory 416 and transceiver 402 in communication via one or more buses 444, which may operate in conjunction with modem 440 and configuring component 442 for configuring a device for performing phase compensation for multiple CCs based on a reduced number of PTRSs, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for node (or base station) operations as opposed to UE operations.

In some aspects, configuring component 442 can optionally include a PTRS component 452 for transmitting a reduced number of PTRSs for multiple CCs, in accordance with aspects described herein.

In some aspects, the processor(s) 412 may correspond to one or more of the processors described in connection with the base station in FIG. 7. Similarly, the memory 416 may correspond to the memory described in connection with the base station in FIG. 7.

FIG. 5 illustrates an example of a flow chart of an example of a method 500 for performing phase compensation for multiple CCs using a reduced number of PTRSs. In an example, a UE 104 can perform the functions described in the method 500 using one or more of the components described in FIGS. 1 and 3. FIG. 6 illustrates an example of a flow chart of an example of a method 600 for configuring a device for performing phase compensation for multiple CCs using a reduced number of PTRSs. In an example, a network node (e.g., base station 102/gNB 180, or a portion of a disaggregated base station 102/gNB 180) can perform the functions described in the method 600 using one or more of the components described in FIGS. 1 and 4. Methods 500 and 600 are described herein in conjunction with one another for ease of explanation; however, the methods 500 and 600 are not required to be performed together, and may be performed by distinct devices.

In method 600, at Block 602, a configuration indicating a reduced number of multiple CCs over which to process one or more PTRSs for performing phase compensation for the multiple configured CCs can be transmitted. In some aspects, configuring component 442, such as in conjunction with processor(s) 412, memory 416, transceiver 402, etc., can transmit the configuration indicating the reduced number of multiple configured CCs over which to process the one or more PTRSs for performing phase compensation for the multiple configured CCs. For example, configuring component 442 can transmit the configuration to a UE 104. In one example, configuring component 442 can transmit at least a portion of the configuration using radio resource control (RRC) or other semi-static signaling. In another example, configuring component 442 can transmit at least a portion of the configuration using a media access control (MAC)-control element (CE) or other dynamic signaling (e.g., on physical downlink control channel (PDCCH), physical downlink shared channel (PDSCH), etc.) to enable or disable the feature(s) at runtime. In this regard, the configuration, in one or more portions, can be used for indicating or activating the reduced number of CCs over which to receive the one or more PTRSs.

In method 500, at Block 502, a configuration indicating a reduced number of multiple CCs over which to process one or more PTRSs for performing phase compensation for the multiple configured CCs can be received. In some aspects, configuration processing component 352, such as in conjunction with processor(s) 312, memory 316, transceiver 302, communicating component 342, etc., can receive the configuration indicating the reduced number of multiple configured CCs over which to process the one or more PTRSs for performing phase compensation for the multiple configured CCs. For example, configuration processing component 352 can receive the configuration from a network node (e.g., a base station 102/gNB 180, a portion of a disaggregated base station 102/gNB 180, etc.). In one example, configuration processing component 352 can receive at least a portion of the configuration using RRC or other semi-static signaling. In another example, configuration processing component 352 can receive at least a portion of the configuration using a MAC-CE or other dynamic signaling (e.g., on PDCCH, PDSCH, etc.) to enable or disable the feature(s) at runtime. In one example, the configuration can be communicated based on capability information exchanged between the UE 104 and network node.

For example, in method 500, optionally at Block 504, an indication of a capability to support using a reduced number of PTRSs for performing phase compensation for multiple configured CCs can be transmitted. In some aspects, configuration processing component 352, such as in conjunction with processor(s) 312, memory 316, transceiver 302, communicating component 342, etc., can transmit an indication of a capability to support using the reduced number of PTRSs for performing phase compensation for multiple configured CCs. For example, configuration processing component 352 can transmit the indication as part of UE capability information in RRC signaling to the network node. In another example, configuration processing component 352 can transmit the indication in a MAC-CE or other dynamic signaling (e.g., on a physical uplink control channel (PUCCH), physical uplink shared channel (PUSCH), etc.).

For example, in method 600, optionally at Block 604, an indication of a capability to support using a reduced number of PTRSs for performing phase compensation for multiple configured CCs can be received. In some aspects, configuring component 442, such as in conjunction with processor(s) 412, memory 416, transceiver 402, etc., can receive an indication of a capability to support using the reduced number of PTRSs for performing phase compensation for multiple configured CCs. For example, configuring component 442 can receive the indication as part of UE capability information in RRC signaling from the UE 104. In another example, configuring component 442 can receive the indication in a MAC-CE or other dynamic signaling (e.g., on a physical uplink control channel (PUCCH), physical uplink shared channel (PUSCH), etc.).

In an example, the configuration (e.g., as transmitted by a network node in Block 602 or received by a UE in Block 502) can include an indicator that the UE is to use one or more PTRSs to perform phase compensation for multiple CCs, where the number of PTRSs can be less than the number of the multiple CCs. In addition, for example, the configuration may indicate a portion of the CCs over which to receive the one or more PTRSs for performing the phase compensation. In yet another example, the configuration may indicate parameters for determining a portion of the CCs over which to receive the one or more PTRSs for performing the phase compensation. For example, the network node can indicate to UE that there is PTRS only on certain carriers and disabled on other CCs (e.g., for an indicated MCS) and UE should use the PTRS from configured CC for phase compensation on all the configured CCs.

In method 600, at Block 606, the one or more PTRSs can be transmitted over the reduced number of the multiple configured CCs. In some aspects, PTRS component 452, such as in conjunction with processor(s) 412, memory 416, transceiver 402, configuring component 442, etc., can transmit the one or more PTRSs over the reduced number of the multiple CCs. For example, PTRS component 452 can transmit a PTRS over one CC to be used for phase compensation of multiple configured CCs, as described. In one example, PTRS component 452 can determine or identify over which CC to transmit the PTRS based on the configuration transmitted to the UE 104 at Block 602.

In method 500, at Block 506, the one or more PTRSs can be received over the reduced number of the multiple configured CCs. In some aspects, communicating component 342, such as in conjunction with processor(s) 312, memory 316, transceiver 302, etc., can receive the one or more PTRSs over the reduced number of the multiple CCs. For example, communicating component 342 can receive a PTRS over one CC to be used for phase compensation of multiple configured CCs, as described. In one example, configuration processing component 352 can determine or identify over which CC the communicating component 342 is to receive the PTRS based on the configuration received by the UE 104 at Block 502.

In method 500, at Block 508, phase compensation can be performed for the multiple configured CCs based on the one or more PTRSs. In some aspects, phase compensating component 354, such as in conjunction with processor(s) 312, memory 316, transceiver 302, communicating component 342, etc., can perform, based on the one or more PTRSs, phase compensation for the multiple configured CCs. For example, phase compensating component 354 can use a single PTRS received over one CC for performing phase compensation over multiple CCs (e.g., including the one CC). For example, phase compensating component 354 can use the single PTRS to phase compensate on the CC over which the PTRS is received, and can use the single PTRS to phase compensate over a different configured CC over which the PTRS is not received. The phase compensation can be for a given time period. In another example, phase compensating component 354 can use a number of PTRSs, less than a number of multiple configured CCs, for performing phase compensation over the multiple configured CCs.

In one example, the configuration (e.g., as transmitted by a network node in Block 602 or received by a UE in Block 502) can include parameters that indicate to use CC(s) having a highest resource block (RB) or MCS allocation and/or having a lowest RB or MCS allocation as the CC(s) for receiving the PTRS(s) for a larger set of CCs. In another example, the parameters may indicate to use a CC(s) allocated in a lowest frequency and/or a highest frequency as the CC(s) for receiving the PTRS(s) for a larger set of CCs.

In method 500, optionally at Block 510, at least one CC of the reduced number of multiple configured CCs can be identified as having a highest or lowest RB or MCS allocation across the multiple configured CCs. In some aspects, configuration processing component 352, such as in conjunction with processor(s) 312, memory 316, transceiver 302, communicating component 342, etc., can identify at least one CC of the reduced number of multiple configured CCs as having a highest or lowest RB or MCS allocation across the multiple configured CCs, and communicating component 342 can receive the PTRS over this at least one CC as identified. For example, where the multiple configured CCs include two CCs, configuration processing component 352 can determine to receive the PTRS over either the CC having the highest RB or MCS, or the CC having the lowest RB or MCS. In one example, configuration processing component 352 can determine this based on one or more parameters indicated in the configuration (e.g., an indication of whether to use the CC having the highest or lowest RB or MCS). In addition, for example, configuration processing component 352 can determine the CC having the highest or lowest RB or MCS based on a separate configuration for the CCs, which can include a RRC configuration of the CCs, downlink control information (DCI) received over the CCs that can indicate the RB allocation and/or MCS to use in communicating over the CCs, etc. In another example, such as where more than two CCs are configured, configuration processing component 352 can determine to receive the PTRS over the CC having the highest RB or MCS, and over the CC having the lowest RB or MCS, and can use these two PTRSs for phase compensating multiple configured CCs (e.g., more than two CCs). In any case, for example, the selection of PTRS(s) can be based on highest or lowest RB/MCS allocation across carriers over a time period (e.g., the same time period related to the RB and/or MCS allocated for the configured CCs).

Similarly, in method 600, optionally at Block 610, at least one CC of the reduced number of multiple configured CCs can be identified as having a highest or lowest RB or MCS allocation across the multiple configured CCs. In some aspects, PTRS component 452, such as in conjunction with processor(s) 412, memory 416, transceiver 402, configuring component 442, etc., can identify at least one CC of the reduced number of multiple configured CCs as having a highest or lowest RB or MCS allocation across the multiple configured CCs, and PTRS component 452 can transmit the PTRS over this at least one CC as identified, as described above in reference to Block 510 in method 500.

In method 500, optionally at Block 512, at least one CC of the reduced number of multiple configured CCs can be identified as being allocated in a highest or lowest frequency across the multiple configured CCs. In some aspects, configuration processing component 352, such as in conjunction with processor(s) 312, memory 316, transceiver 302, communicating component 342, etc., can identify at least one CC of the reduced number of multiple configured CCs as being allocated in a highest or lowest frequency across the multiple configured CCs, and communicating component 342 can receive the PTRS over this at least one CC as identified. For example, where the multiple configured CCs include two CCs, configuration processing component 352 can determine to receive the PTRS over either the CC allocated in the highest frequency (e.g., the highest band or highest side of the band), or the CC allocated in the lowest frequency (e.g., the lowest band or the lowest side of the band). In one example, configuration processing component 352 can determine this based on one or more parameters indicated in the configuration (e.g., an indication of whether to use the CC in the lowest or highest band or part of the band). For example, multiple CC configuration can be done within same band or across different bands. For example, if a UE supports multiple frequency bands at the same time, then two or more CCs can be configured in over these two supported frequency bands. In this example, configuration processing component 352 can identify the at least one CC as being allocated in the highest or lowest frequency band. The same UE can additionally or alternatively be configured multiple CCs within a given one of the frequency bands. In this example, configuration processing component 352 can identify the at least one CC as being allocated in the highest or lowest frequency within a supported frequency band. In another example, such as where more than two CCs are configured, configuration processing component 352 can determine to receive the PTRS over the CC allocated in the highest frequency, and over the CC allocated in the lowest frequency, and can use these two PTRSs for phase compensating multiple configured CCs (e.g., more than two CCs).

Similarly, in method 600, optionally at Block 612, at least one CC of the reduced number of multiple configured CCs can be identified as being allocated in the highest or lowest frequency across the multiple configured CCs. In some aspects, PTRS component 452, such as in conjunction with processor(s) 412, memory 416, transceiver 402, configuring component 442, etc., can identify at least one CC of the reduced number of multiple configured CCs as being allocated in the highest or lowest frequency across the multiple configured CCs, and PTRS component 452 can transmit the PTRS over this at least one CC as identified, as described above in reference to Block 512 in method 500. Other logical distributions of PTRS-enabled CCs (e.g., the reduced number of CCs over which to transmit/receive the PTRS) are possible.

In some examples, the network node can transmit, and/or the UE 104 can receive, the PTRS over different CCs in different time intervals, such as a slot or other time division. For example, a slot, as defined in 5G NR, can include a collection of multiple symbols (e.g., orthogonal frequency division multiplexing (OFDM) symbols, single carrier-frequency division multiplexing (SC-FDM) symbols, etc.). In an example, the slot may include different numbers of symbol depending on whether a normal cyclic prefix (CP) or extended cyclic prefix (CP) is configured, and as such, slots can be of varying lengths of time. In an example, each symbol in the slot can correspond to 1 millisecond (ms) in duration. In one example, the configuration (e.g., as transmitted by a network node in Block 602 or received by a UE in Block 502) can include parameters that indicate to use different CCs for receiving the PTRS in different time slots or other time divisions. Various parameters may be used to achieve this end. For example, the configuration may indicate to alternate over two CCs to receive the PTRS in corresponding time instances, or the configuration may indicate a specific pattern of CCs to use for receiving the PTRS, or a pattern discernable from various parameters such as a number of CCs, a period for switching CCs, etc. In addition, in one example, the configuration may indicate to average the PTRS across two or more CCs in multiple time instances to have better phase error estimate, and to use this average PTRS for performing phase compensation for the two or more CCs (and/or the multiple configured CCs if greater in number than the two or more CCs).

Thus, for example, in method 600, optionally at Block 614, one or more second PTRSs can be transmitted over a second reduced number of the multiple configured CCs. In some aspects, PTRS component 452, such as in conjunction with processor(s) 412, memory 416, transceiver 402, configuring component 442, etc., can transmit the one or more second PTRSs over the second reduced number of the multiple CCs. For example, PTRS component 452 can transmit a second PTRS over a second CC, which can be different from the one CC over which the first PTRS is transmitted. In one example, PTRS component 452 can determine or identify over which CC to transmit the second PTRS in a second time instance, where the first PTRS is transmitted over a different CC in the first time instance, based on the configuration transmitted to the UE 104 at Block 602, and as described further above.

In method 500, optionally at Block 516, the one or more second PTRSs can be received over the second reduced number of the multiple configured CCs. In some aspects, communicating component 342, such as in conjunction with processor(s) 312, memory 316, transceiver 302, etc., can receive the one or more second PTRSs over the second reduced number of the multiple CCs. For example, communicating component 342 can receive a second PTRS over a second CC, which can be different from the one CC over which the first PTRS is received. In one example, configuration processing component 352 can determine or identify over which CC the communicating component 342 is to receive the second PTRS in a second time instance, where the first PTRS is transmitted over a different CC in the first time instance, based on the configuration received by the UE 104 at Block 502, and as described further above. For example, communicating component 342 can receive the PTRS in different CCs in each time instance (e.g., alternating CCs over consecutive time instances, based on a pattern of CCs indicated in the configuration, and/or the like).

In method 500, optionally at Block 518, phase compensation can be performed for the multiple configured CCs based on the one or more second PTRSs. In some aspects, phase compensating component 354, such as in conjunction with processor(s) 312, memory 316, transceiver 302, communicating component 342, etc., can perform, based on the one or more second PTRSs, phase compensation for the multiple configured CCs. For example, phase compensating component 354 can use the second PTRS for performing phase compensation for the multiple configured CCs in or after the time instance during which the PTRS is received. In another example, as described, phase compensating component 354 can average PTRS across carriers (e.g., across the multiple configured CCs) to have a better phase estimate. In another example, phase compensating component 354 can use a first set of a number of PTRSs, less than a number of multiple configured CCs, for performing phase compensation in a first time instance and can use a second set of a number of PTRSs, less than a number of multiple configured CCs, for performing phase compensation in a second time instance.

In another example, the UE 104 can be configured on multiple CCs with multiple codewords (e.g., two CCs with two codewords). In an example, there can be PTRS on first codeword in first CC and on second codeword on second CC. This way effective code rate can be increased but estimation can also be performed across CCs. In one example, the configuration (e.g., as transmitted by a network node in Block 602 or received by a UE in Block 502) can include parameters that indicate to use multiple CCs for receiving the PTRSs in multiple codewords. In this example, configuration processing component 352 can determine to receive a first PTRS in a first codeword over a first CC and a second PTRS in a second codeword over a second CC (and/or a third PTRS in a third codeword over a third CC where more than two codewords per CC are supported, etc.), and communicating component 342 can accordingly receive multiple PTRSs over each of multiple codewords (e.g., at Blocks 506 and 516). In this example, phase compensating component 354 can perform phase compensation for the multiple configured CCs (e.g., at Blocks 508 and/or 518) based on the PTRSs received in multiple codewords (e.g., based on the first PTRS received in the first codeword and the second PTRS received in the second codeword, etc.). For example, phase compensating component 354 can perform phase compensation for the first CC based on the first PTRS and phase compensation for the second CC based on the second PTRS, or can perform phase compensation for both CCs based on an average of the two PTRSs, etc. In addition, in this example, PTRS component 452 can transmit the PTRSs in the separate codewords (e.g., at Blocks 606 and 614).

In method 500, optionally at Block 520, at least one CC of the reduced number of multiple configured CCs can be identified, for a time division, as having a highest number of symbols configured for PTRS in the time division across the multiple configured CCs. In some aspects, configuration processing component 352, such as in conjunction with processor(s) 312, memory 316, transceiver 302, communicating component 342, etc., can identify, in the time division, the at least one CC of the reduced number of multiple configured CCs as having a highest number of symbols configured for PTRS in the time division across the multiple configured CCs, and communicating component 342 can receive the PTRS over this at least one CC as identified for the time division. For example, where the multiple configured CCs include two CCs, configuration processing component 352 can determine to receive the PTRS over either the CC that has, for the time division, the highest number of symbols configured for PTRS. In one example, configuration processing component 352 can determine this based on one or more parameters indicated in the configuration or another configuration for the PTRS. In an example, the CC having the highest number of symbols configured for PTRS can be different in different time divisions (e.g., in different slots). Thus, in some examples, configuration processing component 352 can determine, based on one or more configurations, to use different CCs in different time divisions for receiving PTRS used for phase compensation across the multiple CCs.

Similarly, in method 600, optionally at Block 620, at least one CC of the reduced number of multiple configured CCs can be identified, for a time division, as having a highest number of symbols configured for PTRS in the time division across the multiple configured CCs. In some aspects, PTRS component 452, such as in conjunction with processor(s) 412, memory 416, transceiver 402, configuring component 442, etc., can identify, for the time division, at least one CC of the reduced number of multiple configured CCs as having the highest number of symbols configured for PTRS in the time division across the multiple configured CCs, and PTRS component 452 can transmit the PTRS over this at least one CC as identified, for a given time division, as described above in reference to Block 520 in method 500.

In an example, where the network node uses separate FFT for different carriers, configuring component 442 can indicate to the UE 104 that PTRS is present on both carriers and only separate phase noise estimate is allowed. In this example, phase compensating component 354 can perform separate phase noise compensation for the multiple configured CCs.

Figure 7:
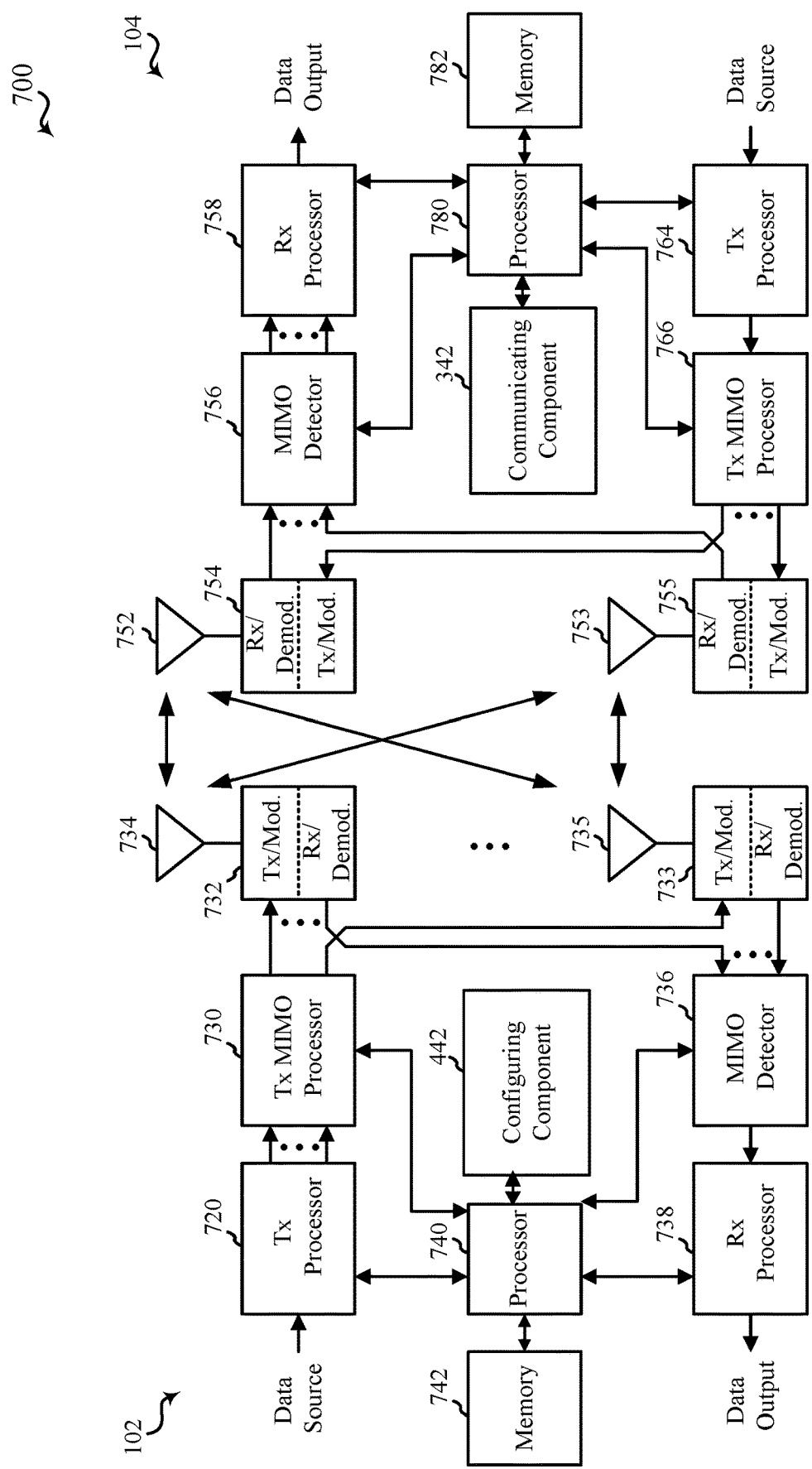
FIG. 7 illustrates a block diagram of an example of a communication system including a base station and a UE.

FIG. 7 illustrates a block diagram of an example communication system 700 including a base station 102, which can include a node 400, a monolithic base station, a disaggregated base station or portion thereof, etc., and a UE 104. The communication system 700 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 3. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 342 (see such as FIGS. 1 and 3).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 442 (see such as FIGS. 1 and 4).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The following aspects are illustrative only and aspects thereof may be combined with aspects of other implementations or teaching described herein, without limitation.

Aspect 1 is a method for wireless communication including receiving, from a network node, a configuration indicating a reduced number of multiple configured CCs over which to process one or more PTRSs for performing phase compensation for the multiple configured CCs, receiving, over the reduced number of multiple configured CCs, the one or more PTRSs, and performing, based on the one or more PTRSs, phase compensation for the multiple configured CCs.

In Aspect 2, the method of Aspect 1 includes identifying at least one CC of the reduced number of multiple configured CCs as having a highest or lowest RB or MCS allocation across the multiple configured CCs.

In Aspect 3, the method of Aspect 2 includes where the reduced number of multiple configured CCs is a single CC.

In Aspect 4, the method of any of Aspects 1 to 3 includes identifying at least one CC of the reduced number of multiple configured CCs as being allocated in a highest or lowest frequency across the multiple configured CCs.

In Aspect 5, the method of any of Aspects 1 to 4 includes where the configuration indicates the reduced number of multiple configured CCs over which to process the one or more PTRSs in a first time division, and indicates at least a second reduced number of CCs over which to process one or more second PTRSs in a second time division, and receiving, over the second reduced number of CCs in the second time division, the one or more second PTRSs, and performing, based on the one or more second PTRSs, phase compensation for the multiple configured CCs in the second time division.

In Aspect 6, the method of any of Aspects 1 to 7 includes where the configuration indicates the reduced number of multiple configured CCs over which to process the one or more PTRSs in a first codeword, and indicates at least a second reduced number of CCs over which to process one or more second PTRSs in a second codeword, and receiving, over the second reduced number of CCs in the second codeword, the one or more second PTRSs, where performing phase compensation for the multiple configured CCs is further based on the one or more second PTRSs.

In Aspect 7, the method of any of Aspects 1 to 6 includes where receiving the configuration includes receiving at least a first portion of the configuration in RRC signaling indicating that the one or more PTRSs are transmitted over the reduced number of CCs for performing the phase compensation for the multiple configured CCs.

In Aspect 8, the method of Aspect 7 includes where receiving the configuration includes receiving at least a second portion of the configuration in dynamic signaling indicating or activating the reduced number of CCs over which to receive the one or more PTRSs.

In Aspect 9, the method of any of Aspects 1 to 8 includes where receiving the configuration is based on transmitting, to the network node, an indication of a capability to support using one PTRS for performing phase compensation for multiple configured CCs.

In Aspect 10, the method of any of Aspects 1 to 9 includes identifying, for a time division, at least one CC of the reduced number of multiple configured CCs as having a highest number of symbols configured for PTRS in the time division across the multiple configured CCs.

Aspect 11 is a method for wireless communication including transmitting a configuration indicating a reduced number of multiple configured CCs over which to process one or more PTRSs for performing phase compensation for the multiple configured CCs, and transmitting, over the reduced number of multiple configured CCs, the one or more PTRSs.

In Aspect 12, the method of Aspect 11 includes selecting at least one CC of the reduced number of multiple configured CCs as having a highest or lowest RB or MCS allocation across the multiple configured CCs.

In Aspect 13, the method of Aspect 12 includes where the reduced number of multiple configured CCs is a single CC.

In Aspect 14, the method of any of Aspects 11 to 13 includes selecting at least one CC of the reduced number of multiple configured CCs as being allocated in a highest or lowest frequency across the multiple configured CCs.

In Aspect 15, the method of any of Aspects 11 to 14 includes where the configuration indicates the reduced number of multiple configured CCs over which to process the one or more PTRSs in a first time division, and indicates at least a second reduced number of CCs over which to process one or more second PTRSs in a second time division, and transmitting, over the second reduced number of CCs in the second time division, the one or more second PTRSs.

In Aspect 16, the method of any of Aspects 11 to 15 includes where the configuration indicates the reduced number of multiple configured CCs over which to process the one or more PTRSs in a first codeword, and indicates at least a second reduced number of CCs over which to process one or more second PTRSs in a second codeword, and transmitting, over the second reduced number of CCs in the second codeword, the one or more second PTRSs.

In Aspect 17, the method of any of Aspects 11 to 16 includes where transmitting the configuration includes transmitting at least a first portion of the configuration in RRC signaling indicating that the one or more PTRSs are transmitted over the reduced number of CCs for performing the phase compensation for the multiple configured CCs.

In Aspect 18, the method of any of Aspects 11 to 17 includes where transmitting the configuration includes transmitting at least a second portion of the configuration in dynamic signaling indicating or activating the reduced number of CCs over which to receive the one or more PTRSs.

In Aspect 19, the method of any of Aspects 11 to 18 includes where transmitting the configuration is based on receiving an indication of a capability to support using one PTRS for performing phase compensation for multiple configured CCs.

In Aspect 20, the method of any of Aspects 11 to 19 includes selecting, for a time division, at least one CC of the reduced number of multiple configured CCs as having a highest number of symbols configured for PTRS in the time division across the multiple configured CCs.

Aspect 21 is an apparatus for wireless communication including a transceiver, a memory configured to store instructions, and one or more processors communicatively coupled with the transceiver and the memory, where the one or more processors are configured to execute the instructions to perform the operations of one or more methods in Aspects 1 to 20.

Aspect 22 is an apparatus for wireless communication including means for performing the operations of one or more methods in Aspects 1 to 20.

Aspect 23 is a computer-readable medium including code executable by one or more processors to perform the operations of one or more methods in Aspects 1 to 20.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
a transceiver;
a memory configured to store instructions; and
one or more processors communicatively coupled with the transceiver and the memory, wherein the one or more processors are configured to:
transmit, to a network node, an indication of a capability to support using one phase tracking reference signal (PTRS) for performing phase compensation for multiple configured component carriers (CCs);

receive, from the a-network node and based on the indication of the capability, a configuration indicating a reduced number of the multiple configured CCs over which to process one or more PTRSs for performing phase compensation for the multiple configured CCs;
receive, over the reduced number of the multiple configured CCs, the one or more PTRSs; and
perform, based on the one or more PTRSs, phase compensation for the multiple configured CCs.

2. The apparatus of claim 1, wherein the one or more processors are further configured to identify at least one CC of the reduced number of the multiple configured CCs as having a highest or lowest resource block (RB) or modulation and coding scheme (MCS) allocation across the multiple configured CCs.

3. The apparatus of claim 2, wherein the reduced number of the multiple configured CCs is a single CC.

4. The apparatus of claim 1, wherein the one or more processors are further configured to identify at least one CC of the reduced number of the multiple configured CCs as being allocated in a highest or lowest frequency across the multiple configured CCs.

5. The apparatus of claim 1, wherein the configuration indicates the reduced number of the multiple configured CCs over which to process the one or more PTRSs in a first time division, and indicates at least a second reduced number of the multiple configured CCs over which to process one or more second PTRSs in a second time division, and wherein the one or more processors are further configured to:
receive, over the second reduced number of the multiple configured CCs in the second time division, the one or more second PTRSs; and
perform, based on the one or more second PTRSs, phase compensation for the second reduced number of the multiple configured CCs in the second time division.

6. The apparatus of claim 1, wherein the configuration indicates the reduced number of the multiple configured CCs over which to process the one or more PTRSs in a first codeword, and indicates at least a second reduced number of the multiple configured CCs over which to process one or more second PTRSs in a second codeword, and
wherein the one or more processors are further configured to receive, over the second reduced number of the multiple configured CCs in the second codeword, the one or more second PTRSs,
wherein the one or more processors are configured to perform phase compensation for the second reduced number of the multiple configured CCs further based on the one or more second PTRSs.

7. The apparatus of claim 1, wherein the one or more processors are configured to receive at least a first portion of the configuration in radio resource control (RRC) signaling indicating that the one or more PTRSs are transmitted over the reduced number of the multiple configured CCs for performing the phase compensation for the multiple configured CCs.

8. The apparatus of claim 7, wherein the one or more processors are configured to receive at least a second portion of the configuration in dynamic signaling indicating or activating the reduced number of the multiple configured CCs over which to receive the one or more PTRSs.

9. The apparatus of claim 1, wherein the one or more processors are further configured to identify, for a time division, at least one CC of the reduced number of the multiple configured CCs as having a highest number of symbols configured for PTRS in the time division across the multiple configured CCs.

10. A method for wireless communication, comprising:
transmitting, to network node, an indication of a capability to support using one phase tracking reference signal (PTRS) for performing phase compensation for multiple configured component carriers (CCs);
receiving, from the a-network node and based on the indication of the capability, a configuration indicating a reduced number of the multiple configured CCs over which to process one or more PTRSs for performing phase compensation for the multiple configured CCs;
receiving, over the reduced number of the multiple configured CCs, the one or more PTRSs; and
performing, based on the one or more PTRSs, phase compensation for the multiple configured CCs.

11. The method of claim 10, further comprising identifying at least one CC of the reduced number of the multiple configured CCs as having a highest or lowest resource block (RB) or modulation and coding scheme (MCS) allocation across the multiple configured CCs.

12. The method of claim 11, wherein the reduced number of the multiple configured CCs is a single CC.

13. The method of claim 10, further comprising identifying at least one CC of the reduced number of the multiple configured CCs as being allocated in a highest or lowest frequency across the multiple configured CCs.

14. The method of claim 10, wherein the configuration indicates the reduced number of the multiple configured CCs over which to process the one or more PTRSs in a first time division, and indicates at least a second reduced number of the multiple configured CCs over which to process one or more second PTRSs in a second time division, and further comprising:
receiving, over the second reduced number of the multiple configured CCs in the second time division, the one or more second PTRSs; and
performing, based on the one or more second PTRSs, phase compensation for the second reduced number of the multiple configured CCs in the second time division.

15. The method of claim 10, wherein the configuration indicates the reduced number of the multiple configured CCs over which to process the one or more PTRSs in a first codeword, and indicates at least a second reduced number of the multiple configured CCs over which to process one or more second PTRSs in a second codeword, and further comprising receiving, over the second reduced number of the multiple configured CCs in the second codeword, the one or more second PTRSs, wherein performing phase compensation for the second reduced number of the multiple configured CCs is further based on the one or more second PTRSs.

16. The method of claim 10, wherein receiving the configuration includes receiving at least a first portion of the configuration in radio resource control (RRC) signaling indicating that the one or more PTRSs are transmitted over the reduced number of the multiple configured CCs for performing the phase compensation for the multiple configured CCs.

17. The method of claim 16, wherein receiving the configuration includes receiving at least a second portion of the configuration in dynamic signaling indicating or activating the reduced number of the multiple configured CCs over which to receive the one or more PTRSs.

18. An apparatus for wireless communication, comprising:
- a transceiver;
- a memory configured to store instructions; and
- one or more processors communicatively coupled with the transceiver and the memory, wherein the one or more processors are configured to:
  - receive, from a user equipment (UE), an indication of a capability to support using one phase tracking reference signal (PTRS) for performing phase compensation for multiple configured component carriers (CCs);
  - transmit, for the UE and based on the indication of the capability, a configuration indicating a reduced number of the multiple configured CCs over which to process one or more PTRSs for performing phase compensation for the multiple configured CCs; and
  - transmit, over the reduced number of the multiple configured CCs, the one or more PTRSs.

19. The apparatus of claim 18, further comprising selecting at least one CC of the reduced number of the multiple configured CCs as having a highest or lowest resource block (RB) or modulation and coding scheme (MCS) allocation across the multiple configured CCs.

20. The apparatus of claim 18, wherein the configuration indicates the reduced number of the multiple configured CCs over which to process the one or more PTRSs in a first time division, and indicates at least a second reduced number of CCs over which to process one or more second PTRSs in a second time division.

* * * * *